UNITED STATES PATENT OFFICE.

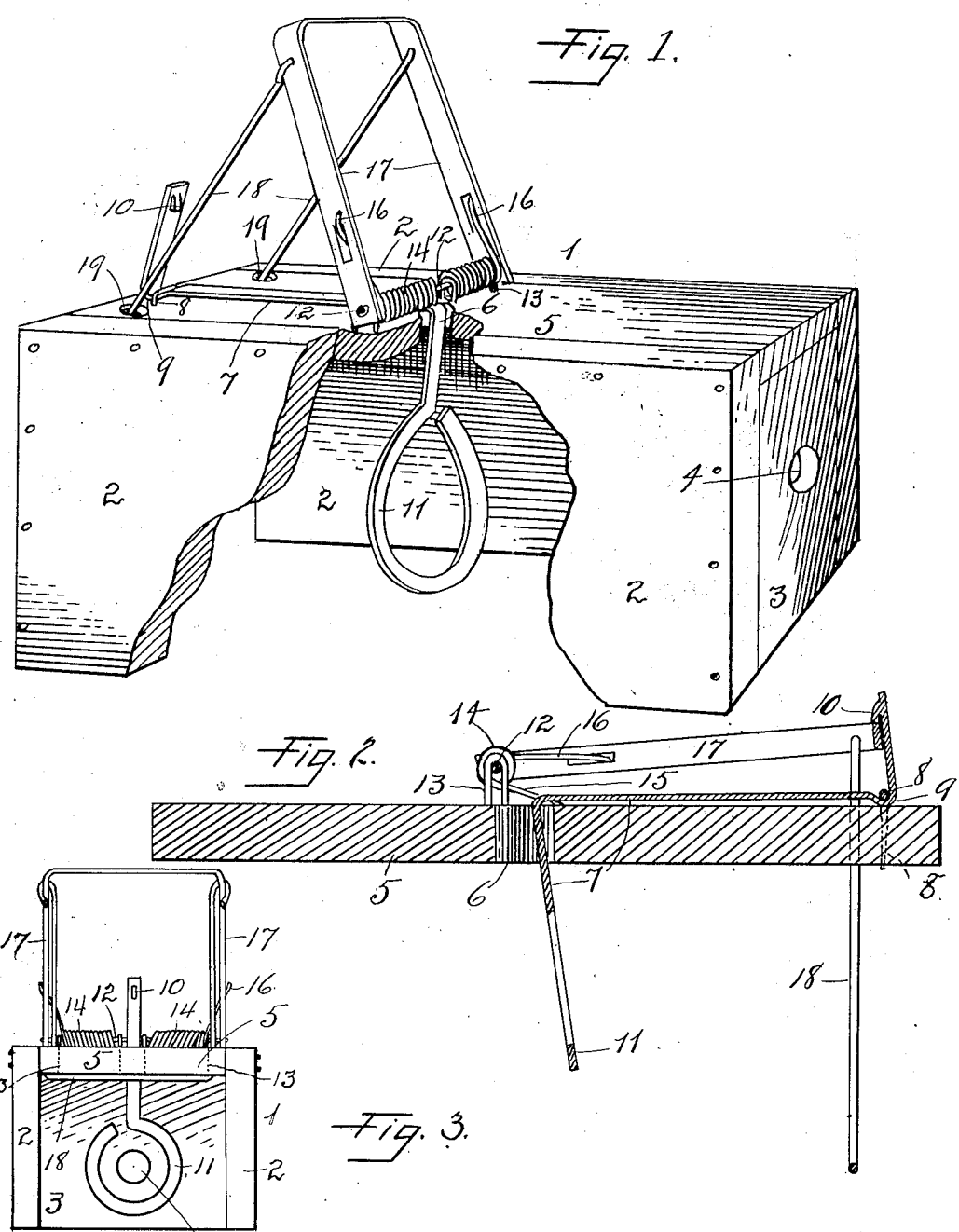

WILLIAM D. ARMSTRONG, WILLIAM CHAUNCEY HOOKER, AND KNOX R. MARKS, OF ABINGDON, ILLINOIS.

GOPHER-TRAP.

No. 872,041.      Specification of Letters Patent.      Patented Nov. 26, 1907.

Application filed June 14, 1907. Serial No. 379,075.

*To all whom it may concern:*

Be it known that we, WILLIAM D. ARMSTRONG, WILLIAM CHAUNCEY HOOKER, and KNOX R. MARKS, all citizens of the United States, and residents of Abingdon, in the county of Knox and State of Illinois, have invented a new and useful Gopher-Trap, of which the following is a specification.

Our invention relates to animal traps of that type or character which include in their construction a base and a substantially U-shaped spring-actuated catching jaw, a portion, at least, of the trap being generally placed underground when in use. In this connection it is well here to describe some of the habits and characteristics of the pocket gopher. All the members of the family spend substantially their entire lives under ground, and their whole organization is modified in accordance with the needs of a subterranean existence. The subterranean tunnel is usually about four inches in diameter and is supplied with numerous outlets where the rodent discharges the dirt which accumulates in the construction of said tunnel. These outlets are always kept closed except when the gopher is at work. The frequency of such openings, which are discovered by the mounds of earth thrown out, clearly show the location of the subterranean tunnel.

With these objects in view, the primary object of the invention is to provide a trap which may be set underneath the surface of the ground or only partly thereunder, and which will effectually serve the purpose for which it is intended and designed. Having this primary object in mind we have provided two forms of such trap, both embodying the same essential features and similar assemblages, both of them adapted to be buried in the ground and covered with light layer of soil, the only difference in the two forms being that one is provided with a housing while the other is not.

Another object is to provide a trap of the class described, the jaw of which is adapted to catch and hold the animal beneath the platform instead of on top thereof as heretofore. By so catching them, the back of the animal will rest against the platform or top 5.

A still further object is to provide a trap the tripping lever of which while projecting through an aperture in the base or platform, is adapted to be tripped by contact of the animal thereagainst, and not by the weight of the animal on the platform.

A still further object is to provide a trap of the type referred to having a wooden support or housing on and in which the moving parts of the trap operate. We, however, do not wish to be understood as limiting our claims to any specific material or materials. And a still further object is to provide a trap of such construction that after having been covered, when set, with soil, the relative positions of the operating parts will be so changed when sprung that they will be plainly exposed to view.

Other objects of our invention consist in novel structural features and combinations of devices, the operation of which devices separately and in combination will be found hereinafter fully described, and the novel combinations of which devices are set forth in the claims hereto appended.

Subsidiary objects will appear as the nature of the invention is better understood.

It will be manifest that while we have termed our invention a "gopher trap," and shall describe it as employed in trapping a gopher, it is equally applicable for catching other animals.

Mechanism showing the structural features, the preferred arrangement, connection and mutual relationship of the moving and still parts of our improvements, is illustrated in the accompanying drawings, in which:—

Figure 1 is a perspective embodying our invention and showing the parts in sprung or unset position; Fig. 2 is a longitudinal central sectional elevation, the box or housing not shown and the ends being reversed from that shown at Fig. 1, the trap being shown as in set position; and Fig. 3, an end view, the parts being in the same relative positions as at Fig. 1.

Attention is called to the numerals of reference on said drawings, the same one indicating the same part in the several figures thereof.

1 indicates a box or housing, preferably of wood and comprising elongated vertical sides 2, an end 3 provided with a light-aperture 4, and a top 5, which top serves as a base or platform on which the active parts of the trap are mounted.

Projected through a central aperture 6 in the platform is a compound or combined tripping and release lever 7 hinged thereto by a staple 8 which strides a depression 9 formed near the outer end of said lever, which end is provided with a detent 10 for a purpose hereinafter described, the longer end of the lever depending beneath the platform and bent to form a trip 11. These are parts of a construction shown and described in Patent No. 722,842, granted March 17, 1903 to W. C. Hooker for mouse traps, but in the patent are actuated in a different manner from the present.

Mounted on a rod 12 pivoted to the platform 5 by staples 13 or in any other suitable manner are torsion springs 14, one end, 15, of each of which is extended and takes against the platform, its other end, 16, being projected through a slot in a substantially U-shaped bow or yoke 17, the ends of which are pivoted on the rod 12. It will be evident that the springs 14 may be otherwise connected to the yoke if preferred, it being required only that the connection be such that they will effectually actuate it. At its free end the yoke 17 is apertured for the reception of the ends of a depending jaw 18, the parallel arms of which preferably pass through enlarged apertures 19 near the front end of the platform.

Numerous unessential details of construction, assemblage and mutual relationship of the parts of our improvements may be made without departing from the general idea and conception of the invention.

The operation follows:—The parts being in the relative positions shown at Figs. 1 and 3, the operator will draw downwardly on the free end of the yoke 17 until it contacts and forces the detent backwardly or toward the open end of the housing. When this movement has progressed until the yoke end (which is preferably strap-like in cross section,) has passed beneath the detent, the trip, which was slightly elevated by the aforesaid movement of the detent, will fall by gravity and return the detent to its normal position, where it will engage the yoke and lock the parts in the relative positions shown in Fig. 2. Let it be supposed that the trap shown at Figs. 1 and 3 is to be used. A vertical hole is dug by the operator down to the bottom of the horizontal tunnel, and the trap, resting on its sides, placed therein. Soil is then thrown over the trap, the sides and top thereof preventing it from filling with dirt and obstructing the working parts. As the rodent goes forward he will pass over the end or cross-piece of the jaw (which is preferably of wire,) strike the trip as he attempts to refill the opening or trap, the movement throwing back the detent and freeing the yoke, which will be thrown upwardly into a substantially vertical position by the springs, and the jaw being connected thereto will be forcibly and with great rapidity drawn upwardly, the animal being caught between it and the top 5, in which position he can make no effective efforts to free himself.

The upward movement just described of the yoke will throw the dirt therefrom; it will stand in the upright position described and indicate to the trapper that the trap has been sprung.

Being buried in soil, in all conditions of weather, moisture will cause the wood parts of the trap to swell. In either of the constructions described the jaw will be free from frictional contact with any part of the trap and its positive operation is not interfered with thereby.

The construction illustrated at Fig. 2 is generally placed in the inclined hole or outlet a V-shaped trench being dug therefor. The operation is the same as in the other, the active parts being identical.

Having thus set forth the construction and operation, the purposes and advantages of our invention, we claim as new the following, to-wit:

1. In a trap, in combination, an apertured base, a spring actuated yoke fulcrumed thereon, a U-shaped jaw, the arms of which are projected through apertures in the base and engage said yoke, and a tripping and release lever fulcrumed at one end of the base, its longer arm extended rearwardly and thence downwardly through an aperture disposed centrally of the base, its shorter arm adapted to engage the yoke and its longer one to be tripped by a rodent.

2. In a trap, in combination, an apertured base, a tripping and release lever pivoted at one end thereof, its longer end extended rearwardly and projected through an aperture disposed centrally of the base, a rod pivotally mounted on said base, torsion springs mounted on said rod, a yoke pivotally mounted on said rod, and adapted to be actuated by said springs, a jaw depending therefrom, its arms passing through apertures in the base, adapted to be actuated by said yoke, one end of said lever adapted for engagement with the yoke and its other end to be tripped by the contact of an animal beneath the base.

In testimony whereof we have hereunto affixed our signatures, at Abingdon, Knox county, Ill., this 10th day of June, 1907.

WILLIAM D. ARMSTRONG.
WILLIAM CHAUNCEY HOOKER.
KNOX R. MARKS.

Witnesses:
  ZOE MARKS,
  J. C. SHOOP.